United States Patent [19]
Sheynblat

[11] Patent Number: 5,831,576
[45] Date of Patent: Nov. 3, 1998

[54] INTEGRITY MONITORING OF LOCATION AND VELOCITY COORDINATES FROM DIFFERENTIAL SATELLITE POSITIONING SYSTEMS SIGNALS

[75] Inventor: Len Sheynblat, Belmont, Calif.

[73] Assignee: Trimble Navigation Limited, Sunnyvale, Calif.

[21] Appl. No.: 883,249

[22] Filed: Jun. 25, 1997

Related U.S. Application Data

[63] Continuation of Ser. No. 414,374, Mar. 31, 1995, abandoned, which is a continuation of Ser. No. 252,681, Jun. 2, 1994, Pat. No. 5,436,632.

[51] Int. Cl.$^6$ .......................... H04B 07/185; G01S 5/02
[52] U.S. Cl. ............................. 342/357; 701/215
[58] Field of Search ............................ 342/357; 701/215

[56] References Cited

U.S. PATENT DOCUMENTS 5,680,140  10/1997  Loomis ................................... 342/357

*Primary Examiner*—Theodore M. Blum
*Attorney, Agent, or Firm*—John Schipper

[57] ABSTRACT

Methods for determining integrity of pseudorange and pseudorange rate signals received from a plurality of M Satellite Positioning System satellites (including GPS and GLONASS), numbered j=j1, j2, . . . , jM, at a reference SATPS station (RS), using pseudorange or pseudorange rate signals received from the same satellites at a nearby signal integrity monitoring (SIM) station. Pseudorange correction values or, alternatively, pseudorange rate correction values, for SATPS signals received at an RS station and at the corresponding SIM station are computed, and difference values between the RS and SIM values are computed for each satellite. If the magnitude of each difference is less than a selected threshold difference, pseudorange corrections or pseudorange rate corrections for that reference station can be used by a nearby mobile station to differentially correct the mobile station location fix coordinates or velocity fix coordinates. If N acceptable pairs of difference values are found for the pseudorange or pseudorange rate corrections, for particular satellites: clock bias or frequency offset can be corrected if N≧1; accuracy of the clock bias or frequency offset coordinate can be monitored if N≧2; and location fix coordinates or velocity fix coordinates can be corrected if N≧3. If magnitudes of differences between measured and known location coordinates or velocity coordinates for the SIM station are less than threshold differences, pseudorange corrections or pseudorange rate corrections for that reference station can be used by a nearby mobile station to differentially correct the mobile station location fix coordinates or velocity fix coordinates.

36 Claims, 5 Drawing Sheets

Threshold Values For Fault Detection

| Significance Levels | Statistical Degrees of Freedom (m-N) | | | | | | | | |
|---|---|---|---|---|---|---|---|---|---|
| | 1 | 2 | 3 | 4 | 5 | 6 | 7 | 8 | 9 |
| 10 % | 2.71 | 4.61 | 6.25 | 7.78 | 9.24 | 10.64 | 12.02 | 13.36 | 14.68 |
| 5% | 3.84 | 5.99 | 7.81 | 9.49 | 11.07 | 12.59 | 14.07 | 15.51 | 16.92 |
| 2.5% | 5.02 | 7.38 | 9.35 | 11.14 | 12.83 | 14.45 | 16.01 | 17.53 | 19.02 |
| 1% | 6.63 | 9.21 | 11.34 | 13.28 | 15.09 | 16.81 | 18.48 | 20.09 | 21.67 |
| 0.5% | 7.88 | 10.60 | 12.84 | 14.86 | 16.75 | 18.55 | 20.28 | 21.96 | 23.59 |
| 0.1% | 10.83 | 13.82 | 16.27 | 18.47 | 20.52 | 22.46 | 24.32 | 26.13 | 27.88 |
| 0.05% | 12.12 | 15.20 | 17.73 | 20.00 | 22.11 | 24.10 | 26.02 | 27.87 | 29.67 |
| 0.001% | 15.14 | 18.42 | 21.11 | 23.51 | 25.75 | 27.86 | 29.88 | 31.83 | 33.72 |

FIG. 2

INTEGRITY MONITORING OF LOCATION AND VELOCITY COORDINATES FROM DIFFERENTIAL SATELLITE POSITIONING SYSTEMS SIGNALS

FIELD OF THE INVENTION

This application is a continuation of an application entitled "Integrity Monitoring of Location and Velocity Coordinates From Differential Satellite Positioning System Signals," U.S. Ser. No. 08/414,374, (now abandoned) filed on Mar. 31, 1995 which is a continuation of 08/252,681 filed Jun. 2, 1994 now U.S. Pat. No. 5,436,632, and assigned to the assignee of this application. This invention relates to use of pseudorange and pseudorange rate signals from SATPS satellites to monitor location and velocity coordinates to evaluate satellite signal integrity.

BACKGROUND OF THE INVENTION

Where differential Satellite Positioning System (DSATPS) signals are combined with SATPS signals to enhance the accuracy of the present location of a mobile user, such as a marine or airborne vessel or land vehicle, one concern is how to monitor the quality or integrity of the signals used in the location computations. Monitoring of signal quality or integrity has thus far used calculations based only on SATPS pseudorange signals. This approach has built-in limitations arising from the fact that the same data are being used to compute SATPS-determined location and to evaluate the quality or integrity of the underlying SATPS signals.

Although measurements and use of pseudoranges are fundamental to SATPS-assisted determination of location and/or time coordinates, only a few patents disclose procedures that work directly with the pseudorange or pseudorange rate values. In U.S. Pat. No. 4,578,678, Hurd discloses a GPS receiver that receives a plurality of pseudorange signals, compares these signals with replicas of the expected pseudorange signals, using a correlation technique, and determines the associated time delay, frequency and other variables of interest for these signals to determine receiver location, velocity, clock offset and clock rate. Several references discuss monitoring one or more parameters associated with a location determination (LD) system, such as GPS or Loran-C, and use of this information in subsequent decisions. Gray et al, in U.S. Pat. No. 4,651,157, disclose use of a plurality of Loran-C or satellites for determining the location of a land-based, marine or airborne vehicle by a receiver/sensor/transmitter (RST) carried on the vehicle. This RST receives the LD signals from the Loran-C or satellite transmitters and retransmits these signals and the values of one or more monitored parameters to a central station that processes this information and determines the RST's present location.

In U.S. Pat. No. 4,791,572, Green et al disclose a system for providing differential corrections to locations determined by a Loran-C LD system that is analogous to a well known system for providing differential corrections for GPS. Another Loran-C differential positioning system is disclosed by Duffet-Smith in U.S. Pat. No. 5,045,861.

Use of a plurality of GPS receivers and antennas to accurately determine the location of a seismic survey vessel is disclosed by Counselman in U.S. Pat. No. 4,809,005. L1 and L2 band carrier waves are received and used (1) to correct for ionospheric time delay and (2) to determine a bias-free pseudorange from each GPS satellite to a given receiver, using signal time averaging. A plurality of receivers, spaced apart from each other on the vessel, is used to compensate for signal blocking by the vessel, to sense and compensate for false signals, and to receive GPS signals by at least one receiver at all times. Another patent issued to Counselman, U.S. Pat. No. 4,894,662, also identifies bias and ionospheric time delay in the pseudorange signals, using C/A signals.

Olsen et al disclose a GPS-based geophysical survey system that includes a fixed GPS reference station and a plurality of mobile survey stations that also use GPS signals, in U.S. Pat. No. 4,814,711. The reference station transmits time-varying signals indicating the desired location of each mobile station. Each mobile station receives these desired-location signals, receives GPS signals, determines the actual location of that mobile station, and periodically transmits to the reference station this actual location and the survey parameters sensed or measured by the mobile station. The reference station compares the actual location and desired location for each reporting mobile station and correlates the reported geophysical information with the corresponding location of that mobile station.

A system that measures velocity of a given object relative to a fixed surface by using Doppler shifts of radio waves received by two receiver/sensor/transmitter combinations is disclosed by Stratton et al in U.S. Pat. No. 4,893,287. Two RSTs face each other and are preferably directed toward the same location on the surface, and the system monitors assertedly random, non-real velocity values by comparison of velocity components at a sequence of times.

Bice et al disclose an aircraft ground collision avoidance system in U.S. Pat. No. 4,924,401. Each aircraft carries an autopilot that monitors "flight states," such as aircraft speed, angle of attack, bank angle and velocity coordinates.

In U.S. Pat. No. 4,970,523, Braistead et al disclose a system that determines differential Doppler frequency shifts received at a vehicle and estimates the present vehicle velocity from these differential shifts.

Keegan discloses a P-code receiver/processor, in U.S. Pat. No. 4,972,431, that analyzes pseudorange and phase for encrypted GPS signals by squaring and filtering the incoming signals. Weaker signals can be analyzed using this technique.

A system for determining the location, orientation and velocity of an airborne vehicle is disclosed in U.S. Pat. No. 4,990,922, issued to Young et al. The system uses two or more antennas, spaced apart on the vehicle to receive GPS signals for this purpose. Post processing of the GPS signal information is performed at a central station. U.S. Pat. No. 5,017,930, issued to Stoltz et al, discloses an aircraft precision landing system that uses four or more signal receivers at fixed, known locations and a centrally located radio signal source. This source transmits an interrogation signal that is received and answered by transponders on the aircraft as the aircraft approaches a landing site. A central station receives the transponder signals and determines the aircraft's computed location along an approach path is compared with the desired path. Location errors are communicated to the aircraft by the central station so that the aircraft can make appropriate adjustments in its present approach path.

A system for monitoring and reporting on the present location of a vehicle generally traveling along a prescribed route is disclosed by Sutherland in U.S. Pat. No. 5,068,656. The vehicle determines its location, compares the present vehicle location with the desired location, and transmits exception reports to a central station if these two locations differ by more than a threshold value.

Allison, in U.S. Pat. No. 5,148,179, discloses a method for using double differences of pseudorange and carrier phase measurements. The technique uses double differences formed from signals received from four satellites by two different receivers to eliminate certain bias and atmospheric perturbation terms.

Harigae et al, in U.S. Pat. No. 5,153,599, disclose clock testing apparatus, connected to a GPS signal receiver on a moving station, that counts clock pulses issued by this receiver. The system determines a receiver clock error and models error in the velocity of the moving station relative to each GPS satellite.

A GPS receiver that uses conventional pseudorange and carrier phase measurements to provide a directional indicator, such as a compass, with improved accuracy is disclosed in U.S. Pat. No. 5,266,958, issued to Durboraw. A single antenna is moved in a closed path, and differences between predicted and actual carrier phases are used to determine location perturbations, which are then resolved into components parallel and perpendicular to a desired path heading in a given plane.

None of the references discussed above examines and uses the pseudorange rate signals derived from Doppler or carrier phase information used to compute pseudorange rate corrections for a DSATPS reference station or to monitor the integrity of the signals received by a DSATPS reference station or by an associated signal integrity monitoring station. Where a reference discusses use of velocity information, it is usually the mobile station velocity that is determined or compared. Only a few U.S. patents innovatively use pseudorange or pseudorange rate signals for any purpose.

What is needed is a system that uses data for signal integrity monitoring that are at least partly independent of the signals used for computation of the pseudorange corrections by a DSATPS reference station. Preferably, independent signal integrity monitoring at a nearby fixed station should be provided to identify or detect anomalous differential correction signals that arise at the reference station and/or anomalous signals used in the computation of the location and/or velocity of the nearby station.

SUMMARY OF THE INVENTION

These needs are met by the invention, which provides method and apparatus for evaluating the quality or integrity of SATPS satellite pseudorange and pseudorange rate signals by monitoring the code and carrier phase signals or Doppler shifts of the incoming satellite signals. Pseudorange and pseudorange rate corrections $PRC(t;i;j)$ and $PRRC(t;i;j)$ are computed for a given DSATPS reference station number i and for each satellite number j that contributes to these corrections. A signal monitoring station performs integrity monitoring by analyzing the pseudorange and pseudorange rate residuals that exclude the reference station clock bias and frequency offset. At the known location of the reference station, clock bias and frequency offset are the only unknown parameters that are part of the computation processes of both pseudorange and pseudorange rate corrections. Integrity monitoring is performed using a fault vector approach, or any equivalent approach.

When a faulty SATPS signal from a particular satellite is detected and identified, this satellite signal is removed from the clock bias and frequency offset estimations. Different criteria apply for correcting and for monitoring the relevant parameters at a reference station.

A signal integrity monitoring (SIM) station receives pseudorange and pseudorange rate corrections and uses these values to compute its own differentially corrected pseudorange and pseudorange rate residuals. The only unknown parameters involved in the computations at a (fixed) SIM station are its own clock bias and frequency offset, computed relative to the clock bias and frequency offset at the reference station. The SIM station computes its own location and velocity fix coordinates in the same manner as for any other station that is remote from the reference station. Because the SIM station location is fixed and the noise characteristics of the velocity-related measurements are less affected by multipath errors, the fault detection where fault isolation are performed in the velocity domain and complements the monitoring done in the position domain.

BRIEF DESCRIPTION OF THE DRAWINGS

FIG. 2 is a table of dimensionless threshold values useful in certain fault vector tests discussed in the text.

DESCRIPTION OF BEST MODES OF THE INVENTION

Figure 1:
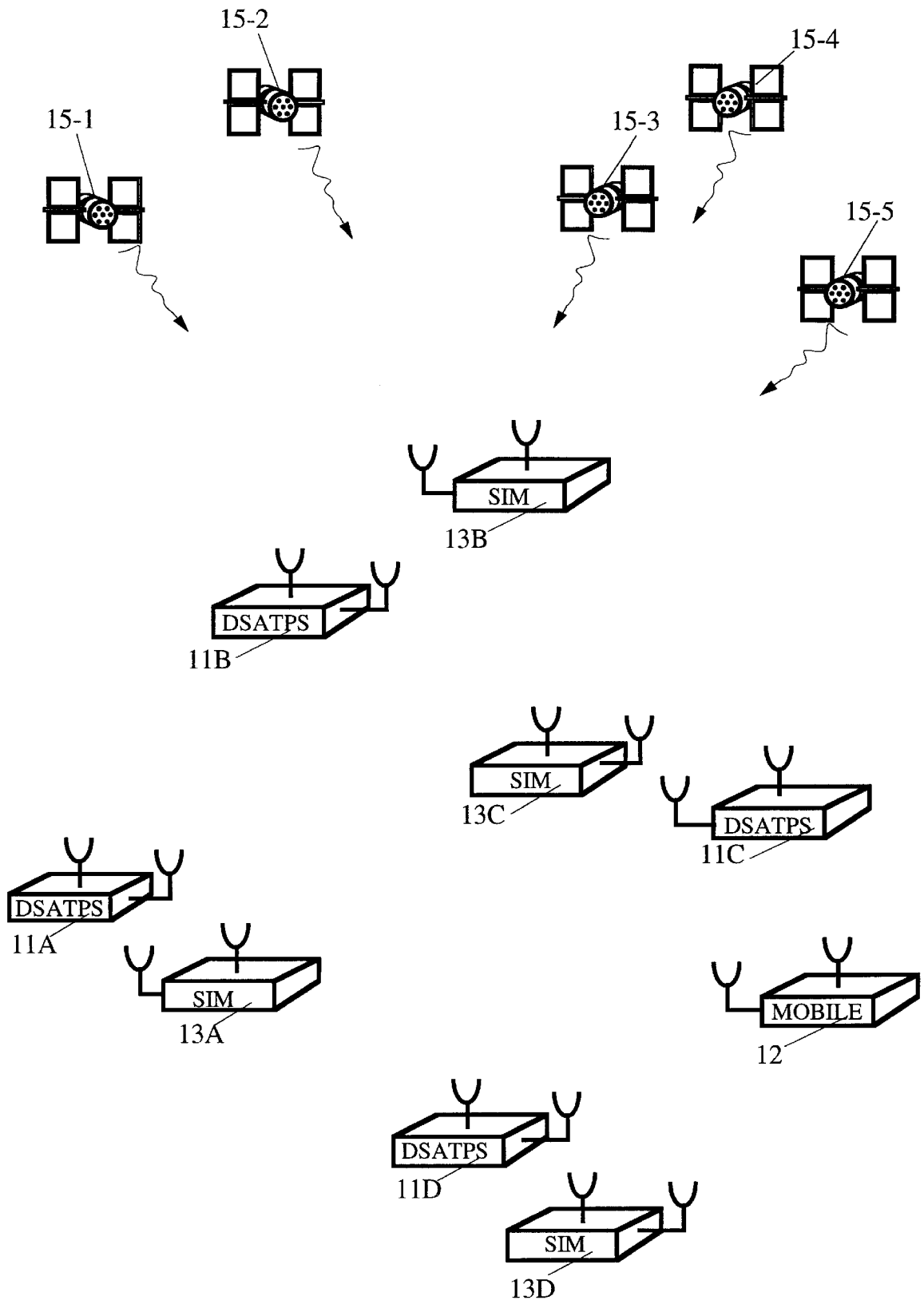
FIG. 1 is a schematic view illustrating use of the invention to monitor the satellite signal quality or integrity of signals received at a plurality of SATPS stations.

FIG. 1 illustrates a network of differential SATPS (DSATPS) or reference stations 11A, 11B, 11C, 11D, whose GPS correction signals provide a mobile station 12 with pseudorange AND pseudorange rate signals of enhanced accuracy. Adjacent DSATPS stations are spaced apart by distances of about 200–300 km, or more if desired. Each DSATPS station 11A, 11B, 11C, 11D is "paired" with a DSATPS signal integrity monitoring (SIM) station 13A, 13B, 13C, 13D, and the antenna of each pair of stations $11i$ and $13i$ (i=A, B, C, D) are located within a relatively short distance ($\leq 1$ kilometer, preferably $\leq 20$–30 meters) of each other. The location of each DSATPS station $11i$ and of each SIM station $13i$ is known with high accuracy, through surveying or another suitable measurement technique. A DSATPS station and its associated SIM station can be both stationary or can move slowly along separate paths with location coordinates that are known at (at least) a sequence of times.

Each DSATPS station $11i$ and each SIM station $13i$ receives pseudorange information from a plurality of SATPS satellites 15-1, 15-2, 15-3, 15-4, 15-5 and computes the pseudorange corrections $PRC(t;i;j)$ and pseudorange rate corrections $PRRC(t;i;j)$, corresponding to the SATPS signals received from the satellite 15-j=1, 2, 3, 4, 5), for its own known location. Residual error computations, Doppler shift measurements and/or carrier phase measurements for the SATPS signals can be used for the pseudorange rate measurements. Pseudorange corrections alone are presently used to compute differentially corrected locations of each SIM station. Pseudorange rate corrections have not been used for monitoring or related purposes. One advantage of use of pseudorange rate corrections for signal integrity monitoring is that different data are used here so that an independent check is provided on the integrity of the pseudorange corrections that are determined by the reference station. The pseudorange signals PR, Doppler-based pseudorange rate signals PRR and carrier phase signals $\Phi$ received from a satellite j by a reference station or SIM station i are expressed as $$PR(t;i;j)=R(t;i;j)+SCB(t;j)+RCB(t;i)+\tau_T(t;i;j)+\tau_I(t;i;j)+m(t;i;j)+\eta(t;i;j), \quad (1)$$

$$PRR(t;i;j)=RR(t;i;j)+SFE(t;j)+RFE(t;i)+\tau_T'(t;i;j)+\tau_I'(t;i;j)+m'(t;i;j)+\eta'(t;i;j), \quad (b\ 2)$$

$$\Phi_t;i;j)=\lambda N(i;j)+R(t;i;j)+SCB(t;j)+RCB(t;i)+\tau_T(t;i;j)-\tau_I(t;i;j)+m''(t;i;j)+\eta''(t;i;j), \quad (3)$$

where $R(t;i;j)$ represents the "true" SATPS range and $RR(t;i;j)$ represents the "true" range rate from the station number $i$ to the satellite number $j$ at the time $t$, as determined from the SATPS navigation ephemeris (or almanac information) received by the reference station $11i$ or SIM stations $13i$, $\lambda$ is the SATPS carrier signal wavelength, and $N(i,j)$ is the integer number of wavelengths associated with the carrier phase signal. The number $N$ is initially ambiguous; but once $N$ is found it does not change with time as long as continuous carrier lock is maintained. The carrier phase signal $\Phi(t;i;j)$ is obtained from analysis of integrated Doppler shifts of the SATPS signals received and includes error contributions from the sources indicated on the right hand side of Eq. (3). Here, SCB $(t;j)$ is the satellite clock bias error, RCB $(t;i)$ is the receiver clock bias error, SFE$(t;j)$ and RFE $(t;i)$ are the satellite frequency offset error and receiver frequency offset error, $\tau_T(t;i;j)$ and $\tau_I(t;i;j)$ are the tropospheric signal propagation time delay and ionospheric signal propagation time delay, $m(t;i;j)$, $m'(t;i;j)$ and $m''(t;i;j)$ are the multipath signal error contributions for the pseudorange, pseudorange rate and carrier phase signals, and $\eta(t;i;j)$, $\eta'(t;i;j)$ and $\eta''(t;i;j)$ are the receiver noise error contributions for the pseudorange, pseudorange rate and carrier phase signals.

The pseudorange rate values $PRR(t;i;j)$ for a reference station $11i$ or a SIM station $13i$ can also be obtained by forming a time derivative (or a simple time difference ratio) of the carrier phase signal $\Phi(t;i;j)$ for the reference station or SIM station from Eq. (3). For example, this time derivative can be formed as $$PRR(t;i;j)=[\Phi((t;i;j)-\Phi(t-t;i;j)]\Delta t, \quad (4)$$

where the carrier phase values $\Phi(t;i;j)$ are assumed known for the times $t-\Delta t$ and $t$. A first alternative definition for this time derivative uses a three-term approximation $$y(t)=y_n+a_n(t-t_n)+b_n(t-t_n)^2, \quad (5)$$

for the variable $y(t)=\Phi(t;i;j)$, using known values of $y$ at three consecutive time values $t=t_{n-1}$, $t=t_n$ and $t=t_{n+1}$, with the time derivative at $t=t_n$ being defined as $$PRR(t_n;i;j)=y(t_n)=t_n=\{(t_n-t_{n-1})^2[y(t_{n+1})-y(t_n)]+(t_{n+1}-t_n)^2[y(t_{n-1})-y(t_n)]\}/(t_{n+1}-t_n)(t_{n+1}-t_{n-1})(t_{n+1}-t_{n-1}). \quad (6)$$

A second alternative definition uses the Doppler shift signals from Eq. (2) for the station $i$ and satellite $j$. Recall that the reference station and the SIM station, for which the pseudorange rate values are computed from incoming SATPS signals, have fixed, known locations. Thus, the pseudorange and pseudorange rate correction values PRC $(t;i;j)$ and PRRC$(t;i;j)$ for a particular station/satellite pair $(i,j)$ are the negatives of the corresponding pseudorange and pseudorange rate residual error value computed using the incoming SATPS signals, viz.

$$PRC(t;i,j)=-PRRE(t;i,j), \quad (7)$$

$$PRRC(t;i,j)=-PRRRE(t;i,j). \quad (8)$$

This last equation is easily changed if the SIM station has (small) known velocity components relative to a fixed location.

At the reference or DSATPS station, the pseudorange correction and pseudorange rate correction are computed according to $$PRC(t;i;j)_{RS}=R(t;i;j)-[PR(t;i;j)-SCB(t;i;j)-RCB(t;i;j)]=-[PRE(t;i;j)_{RS}+\tau_T(t;i;j)+\tau_I(t;i;j)+m(t;i;j)+\eta(t;i;j)],$$
$$=-PRRE(t;i;j)_{RS}, \quad (9)$$

$$PRRC(t;i;j)_{RS}=RR(t;i;j)-[PRR(t;i;j)-SFE(t;i;j)-RFE(t;i;j)]=-[RRE(t;i;j)_{RS}+\tau_T(t;i;j)-\tau_I(t;i;j)+m'(t;i;j)+\eta'(t;i;j)],$$
$$=-PRRRE(t;i;j)_{RS}, \quad (10)$$

where $PRE(t;i;j)$ and $RRE(t;i;j)$ are the residual errors at the reference station for the pseudorange and pseudorange rate values due to Selective availability errors and other errors.

At the SIM station, the pseudorange residual error and pseudorange rate residual error values $PRRE(t;i;j)_{SIM}$ and $PRRRE(t;i,j)_{SIM}$ are computed in a similar manner. The differentially corrected pseudorange and pseudorange rate residual errors at the SIM station then become $$DPRE(t;i;j)_{SIM}=PRRE(t;i;j)_{SIM}+PRC(t;i;j)_{RS}=PRE(t;i;j)_{SIM}-PRE(t;i;j)_{RS}+m(t;i;j)_{SIM}-m(t;i;j)_{RS}+\eta(t;i;j)_{SIM}-\eta(t;i;j)_{RS}+\epsilon(t;i,j), \quad (11)$$

$$DPRRE(t;i;j)_{SIM}=PRRRE(t;i;j)_{SIM}+PRRC(t;i;j)_{RS}=RRE(t;i,j)_{SIM}-RRE(t;i;j)_{RS}+m'(t;i;j)_{SIM}-m'(t;i;j)_{RS}+\eta'(t;i,j)_{SIM}-\eta'(t;i;j)_{RS}+\epsilon'(t;i,j), \quad (12)$$

where $\epsilon(t;i;j)$ and $\epsilon'(t;i;j)$ are uncompensated errors for pseudorange and pseudorange rate measurements, respectively, arising from a satellite malfunction. The differentially corrected residual errors in Eqs. (11) and (12) are linearized with respect to the nominal reference station and SIM station locations, clock biases and frequency offset errors.

Errors arising from M measurements with K unknowns ($M \geq K+1$) are developed from an overdetermined array of linear equations of the form $$y=H\ x+w. \quad (13)$$

Here, $y$ is an $(K+i) \times 1$ vector ($M > K+1$ for monitoring K-dimensional location or velocity solutions; $K=0, 1, 2$ or 3) whose components (1) are the differential range residuals $DPRE(t;i;j)_{SIM}$ for each in-view satellite (j) between the measured pseudorange and the predicted range, or (2) are the differential range rate residuals $DPRRE(t;i;j)_{SIM}$ between the measured pseudorange rate and the predicted range rate at the SIM station. Here, H is an $M \times (k+1)$ matrix, referred to as a "Jorgensen matrix" for convenience, that transforms from the space of M pseudorange (or pseudorange rate) measurements to the state space of K location coordinates plus clock bias coordinates (or to the state space of K velocity coordinates plus frequency offset coordinates). These K+1 location and clock bias values (or K+1 velocity and frequency offset values) are referred to collectively as K+1 "location parameters" (or as K+1 "velocity parameters") in the following discussion. The H matrix entries are "1" in the last row, and direction cosines of the line of sight from the SATPS station antenna to the M SATPS satellites in the other rows of the matrix. The matrix H corresponds to an $N \times 4$ matrix G discussed by R. G. Brown in "A Baseline RAIM Scheme and a Note on the Equivalence of Three RAIM Methods," presented at the Institute Of Navigation National Technical Meeting, San Diego, Calif., Jan. 27–29 1992. Computation of the components of the observation matrix H is discussed by P. S. Jorgensen in "Navstar/Global Positioning System 18-Satellite Configurations," Navigation, vol. 2, 1984, pp. 1–12, Appendix B, incorporated by reference herein. The $(K+1) \times 1$ vector w in Eq. (13) contains errors due to receiver noise, multipath and other uncommon errors between the reference station and the integrity monitor, and errors $\epsilon$ and $\epsilon'$ arising from a satellite failure. Normally, $\epsilon$ and $\epsilon'$ are zero. For the SIM station, where the only unknowns are the SIM station clock bias RCB and the receiver clock frequency error RFE, the requirement for monitoring location is $M>1$.

A weighted least squares solution of Eq. (13) is $$x_{LS} = H^* y, \qquad (14)$$

$$H^* = (H^{tr} R^{-1} H)^{-1} H^{tr} R^{-1}. \qquad (15)$$

Here, $H^*$ is the $(K+1) \times M$ pseudoinverse matrix for H. Fault detection computations are performed based on fault vector hypothesis testing, using an $M \times 1$ fault vector $$f = S R^{-\frac{1}{2}} y, \qquad (16)$$

where $f = f(t;i;j)$ represents the residual error vector of the overdetermined solutions for Eq. (13), weighted by the expected accuracy of the measurements. Here, $R = R(t;i;j)$ is an $(K+1) \times (K+1)$ measurement error covariance matrix for the noise vector w and is defined by the relation $$R = \text{Expectation}[w \, w^{tr}], \qquad (17)$$

and $$S = S(t;i,j) = [I - R^{-\frac{1}{2}} H (H^{tr} R^{-1} H)^{-1} H^{tr} R^{-\frac{1}{2}}] \qquad (18)$$

is the $M \times M$ fault vector covariance matrix.

The fault vector magnitude (a scalar)

$$D(t) = f^{tr} f \qquad (19)$$

is computed, and a suitable test for failure is whether $$D > D_{thr}, \qquad (20)$$

where $D_{thr}$ is a threshold value that is based on the false alarm rate and has $M-(K+1)$ statistical degrees of freedom. If $D \leq D_{thr}$, no fault is detected. A normalized statistical variable $$U(t) = D(t)/(M-K-1) \qquad (21)$$

can be computed to verify the proper modelling of the weighted solution. If the measurement errors are suitably described by the measurement error covariance matrix $R(t;i,j)$, the expected value of $U(t;i;j)$ is 1.0. If the expected value of $U(t;i;j)$ is $>1.0 (<1.0)$, the modelling has been too optimistic (too pessimistic) and should, perhaps, be recomputed. If the components of the fault vector are not equally important in a given situation, the fault vector magnitude in Eq. (19) can be replaced by $$D'(t;i;j) = f^{tr} V f, \qquad (19')$$

where V is a diagonal matrix with non-negative diagonal entries chosen to reflect the relative importance of the components of f.

FIG. 2 is a table setting forth dimensionless threshold values $D_{thr}$ for different values $M-(K+1)=1$ through 9 of the statistical degrees of freedom and for different significance levels, or acceptable probabilities of a Type 1 error (probability of rejection of satellite signals that are valid). The threshold values in FIG. 2 are based upon a chi-square distribution.

A sequence of quantities $$\tau_j = f_j^2 / S_{jj} (j=1, 2, \ldots, K+1) \qquad (22)$$

is computed, where $f_j$ and $S_{jj}$ are the jth entry and the jth diagonal entry for the vector f and matrix S, respectively. One first selects the largest value $\tau_{J1}$ and the second largest value $\tau_{J2}$ from the sequence of values $\tau_j$ and forms the difference $$\Delta \tau_{J1, J2} = \tau_{J1} - \tau_{J2}. \qquad (23)$$

Let $p_{J1}$ and $p_{J2}$ be the probabilities that the quantity $\tau_j$ defined in Eq. (22) attains the respective values $\tau_{J1}$ and $\tau_{J2}$. The probability values $p_{J1}$ and pJ2 are either estimated from a sequence of measurements or computed from first principles. The likelihood ratio $R_{J1,J2} = 2 \log_e(p_{J1}/p_{J2})$ is determined and compared with the difference value $\Delta \tau_{J1,J2}$. If Eq. (20) is valid and $$\Delta \tau_{J1,J2} > R_{J1,J2}, \qquad (24)$$

this indicates that the pseudorange information or the pseudorange rate signals received from the satellite $j=J1$ are unreliable, and the pseudorange and pseudorange rate signals received from this satellite must be removed from the set of SATPS satellite signals used for correcting and/or monitoring signals received at the SIM station. If $\Delta \tau_{J1, J2} \leq R_{J1,J2}$, but $D > D_{thr}$, as in Eq. (20), it cannot be determined from this analysis whether the set of satellite signals received from the SATPS satellite $j=J1$ should be removed from the set of signals used for correcting and/or monitoring. One may repeat the analysis associated with Eqs. (22), (23) and (24) with the values $\tau_{J2}$ and $\tau_{J3}$, substituted for $\tau_{J1}$ and $\tau_{J2}$, respectively, where $\tau_{J3}$ is the third largest value in the sequence of values $\tau_j$. If appropriate, this analysis can be extended to other consecutive members $\tau_{Jm}$ and $\tau_{J(m+1)}$ of the sequence to determine if SATPS signals from the SATPS satellite corresponding to $j=Jm$ should be removed from the usable satellite signals.

If the number M of SATPS signals from distinct satellites and corresponding corrections received by the SIM station satisfies $M \geq 1$, the clock bias (or frequency offset) for the SIM station can be corrected. If $M \geq 2$, the clock bias (or frequency offset) of the SIM station can be monitored, as well as corrected. If $M \geq K$ ($K=1, 2, 3$), K location coordinates (or K velocity coordinates) for the SIM station can be corrected. If $M \geq K+1$ ($K=1, 2, 3$), the clock bias (or frequency offset) plus K location coordinates (or K velocity coordinates) for the SIM station can be corrected; or, alternatively, K location coordinates for the SIM station can be monitored. If $M \geq K+2$ ($K=0,1,2,3$), a satellite, if any, whose SATPS signals are not acceptable, based on the preceding analysis, can be identified or isolated, in addition to correction of the clock bias (or frequency offset) and of K location coordinates (or velocity coordinates); or in addition to monitoring of location coordinates (or velocity coordinates) for the SIM station. For notational convenience, a set including clock bias and K location coordinates, or a set of K+1 location coordinates, will be referred to as a set of K+1 "location parameters"; and a set including frequency offset and K velocity coordinates, or a set of K+1 velocity coordinates, will be referred to as a set of K+1 "velocity parameters". Reference to "parameters," without further specification, will refer either to location parameters or to velocity parameters. Where K location coordinates or K velocity coordinates are being corrected or monitored, it is assumed that a precise clock bias parameter or a precise frequency offset parameter, respectively, is available to and used by the SIM station for the clock bias or frequency offset value.

Sturza, in "Navigation System Integrity Monitoring Using Redundant Measurements," Navigation, vol. 25 (1988–1989) pp. 483–501, analyzes an equation similar to Eq. (13), using similar techniques as in Eqs. (13)–(20).

The Sturza article limits its fault testing to pseudorange values. The approach disclosed here talkes further advantage of the stationary or known locations of the reference station and associated SIM station.

In one embodiment of the invention, the magnitudes of the pseudorange rate corrections $PRRC(t;i;j)$ are determined for a SIM station $13i$ and compared with a selected rate threshold $PRRC(i;j)_{thr}$, which may be the same or different for each SIM station i and each satellite j. Here, it is required that $$|PRRC(t;i;j)| \leq PRRC(i;j)_{thr}. \qquad (25)$$

in order that the pseudorange rate corrections for the reference station-satellite combination (i;j) be acceptable. The pseudorange rate corrections $PRRC(t;i;j)$ are analyzed to determine which, if any, of the SATPS satellites or reference (DSATPS) stations is providing erroneous information. This information might identify a faulty satellite clock, a faulty reference station clock or frequency offset, presence of multipath signals, or presence of ionospheric time delay or tropospheric time delay that is not adequately accounted for, or other error sources.

The differentially corrected range residual error magnitudes [DPRE(t;i;j)] and the differentially corrected range rate residual error magnitudes [DRRE(t;i;j)] are used in the fault vector analysis discussed above. If one or more of these magnitudes is greater than a corresponding selected threshold, that is, if at least one of the two constraints $$|DPRE(t;i;j)| \leq DPRE(i;j)_{thr}, \qquad (26)$$

$$|DPRRE(t;i;j)| \leq DPRRE(i;j)_{thr} \qquad (27)$$

is violated, the accuracy of the corresponding pseudorange value PR(t;i;j) or pseudorange rate value PRR(t;i;j) is assumed to be unacceptably inaccurate, and the SATPS signals received from another SATPS satellite (j') are substituted for the SATPS signals received from the satellite number j. If at least four satellites (j) can be found that satisfy all of the constraints set forth in Eqs. (26) and (27), the corresponding DSATPS corrections for that reference station have acceptable accuracy and can be used for correcting the pseudorange and/or pseudorange rate values for nearby mobile SATPS stations.

If any satellite (j) is found that does not satisfy the constraints of Eqs. (26) and (27), the accuracies of the pseudorange and/or pseudorange rate corrections for that reference station (i) and that satellite (j) are assumed to be compromised. In this instance, this reference station (i) transmits its DSATPS corrections to nearby users but notifies the users that these DSATPS corrections are of questionable accuracy. Optionally, this reference station (i) can also transmit the differential residual magnitudes |DPRE (t;i;j')| and |DPRRE(t;i;j)| and allow the mobile user to determine if the DSATPS corrections from this reference station will be accepted and used.

The results of comparison of the pseudorange and pseudorange rate corrections can be broadcast by a reference (DSATPS) station (or by the adjacent SIM station) for use by an SATPS mobile station 17 that is operating in the vicinity of that DSATPS station. Alternatively, the results of comparison of the pseudorange rate corrections for the SIM station or a DSATPS station can be transmitted to a central station 19 for further signal processing or for retransmission to the mobile station 17.

The pseudorange residuals and pseudorange rate residuals, including the corrections thereto, are given by the respective relations $$DPRE(t;i;j) = PR(t;i;j) - R(t;i;j) - b(t;i;j) + PRC(t;i;j), \qquad (28)$$

$$DPRRE(t;i;j) = PRR(t;i;j) - RD(t;i;j) - b(t;i;j) + RRC(t;i;j), \qquad (29)$$

where PR and PRR represent the pseudorange and pseudorange rate, R and RD represent the "true" range and "true" range rate (given by Doppler, carrier phase or other measurements), b and b represent the clock bias and clock bias rate, and PRC and RRC represent the corrections for pseudorange and pseudorange rate for a particular DSATPS station/satellite combination (i,j).

Figure 3A:
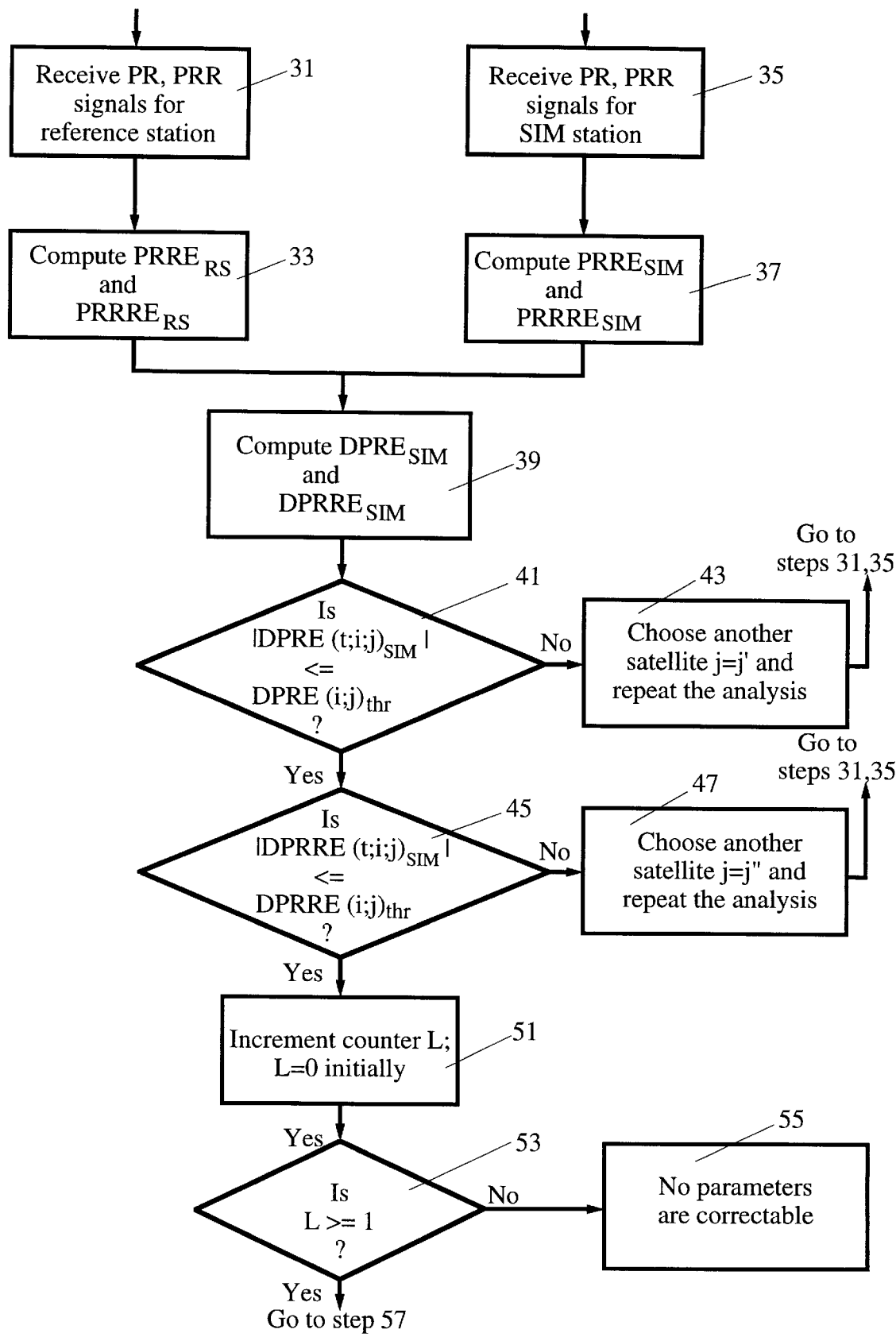
FIGS. 3A, 3B, and 4 illustrate procedures used to correct or monitor signal integrity according to embodiments of the invention.
Figure 3B:
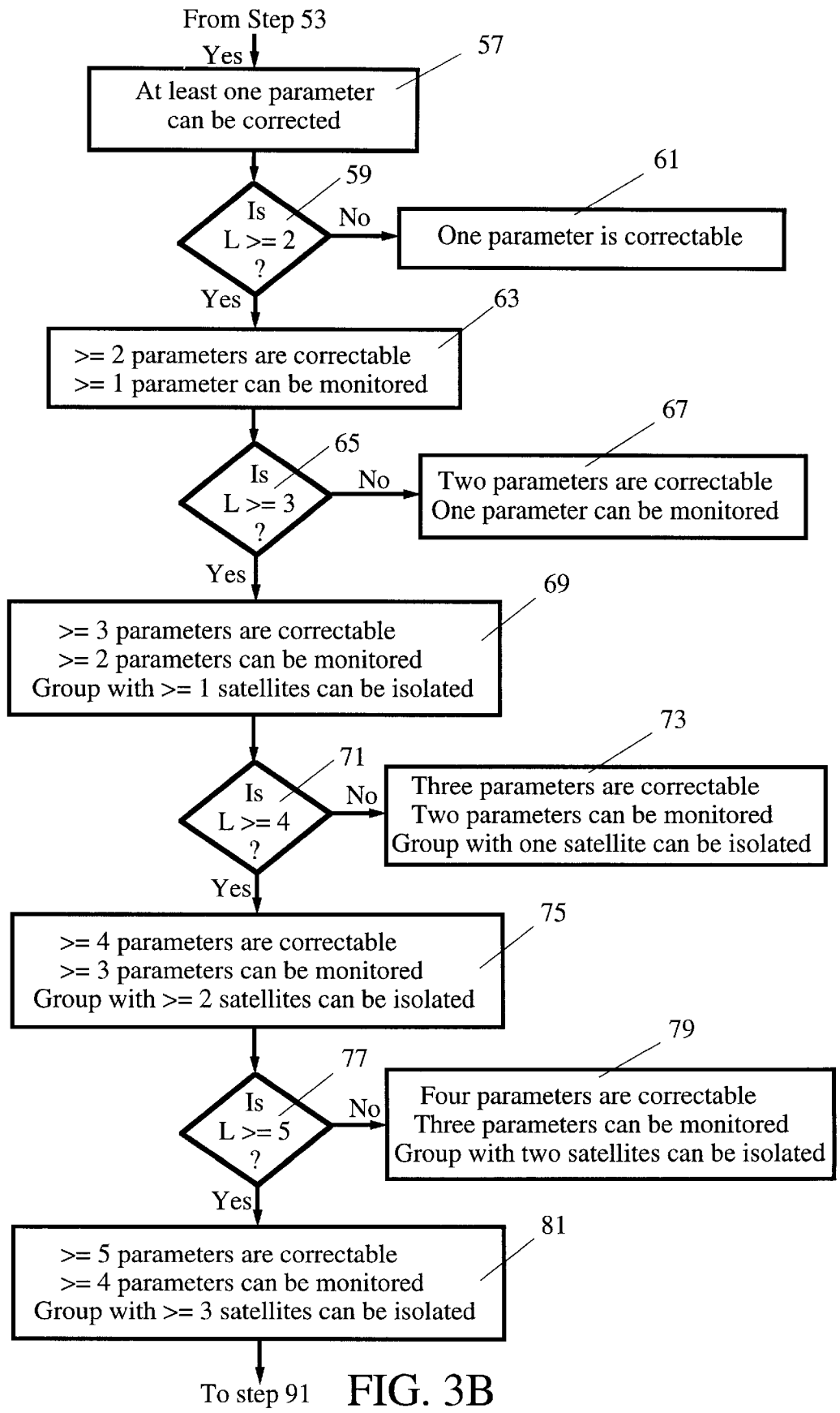

FIGS. 3A and 3B together illustrate a procedure for monitoring and checking the integrity of the signals received in a neighborhood of the DSATPS reference station according to the invention. In steps 31 and 33, the reference station receives and measures the pseudorange signals PR and pseudorange rate signals PRR from M SATPS satellites and determines the pseudorange corrections $PRC_{RS} = -PRRE_{RS}$ and pseudorange rate corrections $PRRC_{RS} = -PRRRE_{RS}$ to be applied to these signals, by comparing the psuedorange and pseudorange rate signals received to the computed range and range rate values based on the known location and velocity coordinates.

In steps 35 and 37, the SIM station receives and measures the pseudorange signals PR and pseudorange rate signals PRR from the same M satellites and determines the pseudorange corrections $PRC_{SIM} = -PRRE_{SIM}$ and pseudorange rate corrections $PRRC_{SIM} = -PRRRE_{SIM}$ by similar comparisons.

In step 39, the residual differential errors $DPRE_{SIM}$ and $DPRRE_{SIM}$ are computed. In step 41, the pseudorange residual error $|DPRE(t;i;j)_{SIM}|$ compared with its corresponding threshold $DPRE(i;j)_{thr}$. If Eq. (26) is not satisfied, the system chooses another satellite j=j' and repeats the analysis of the quantities PRRE, PRRRE, DPRE and DPRRE, in step 43. If Eq. (26) is satisfied, the system proceeds to step 45. Steps 39 and beyond are implemented at the SIM station.

In step 45, the pseudorange residual error DPRRE(t;i;j) SIM is compared with its corresponding threshold DPRRE $(i;j)_{thr}$. If Eq. (27) is not satisfied, the system chooses another satellite j=j" and repeats the analysis of the quantities PRRE, PRRRE, DPRE and DPRRE, in step 47. If Eqs. (26) and (27) are satisfied, the reference station can use the measured pseudorange and pseudorange rate values from that satellite (j) to determine the pseudorange and pseudorange rate corrections that are broadcast to nearby mobile stations.

In step 51, a counter L, which is initially=0 and satisfies L≦M if M satellites are presently in view, is incremented by ΔL=1 each time another satellite (j) satisfies Eqs. (26) and (27). In step 53, the system checks whether L≧1. If L is not ≧1 (step 55), no SATPS parameters (e.g., clock bias and/or frequency offset and/or location coordinates and/or velocity coordinates) are correctable. If L≧1, at least one parameter is correctable, as in step 57, and the system proceeds to step 59.

In step 59, the system checks whether L≧2. If L is not ≧2, L=1 and one parameter is correctable, as in step 61. If L≧2, at least two parameters are correctable, or at least one parameter can be monitored, as in step 63, and the system proceeds to step 65.

In step 65, the system checks whether L≧3. If L is not ≧3, L=2 and two parameters are correctable, or one parameter can be monitored, as in step 67. If L≧3, at least three parameters are correctable, or at least two parameters can be monitored, or a group containing one or more satellites can be isolated, as in step 69, and the system proceeds to step 71.

In step 71, the system checks whether L≧4. If L is not ≧4, L=3 and three parameters are correctable, or two parameters can be monitored, or one parameter can be isolated, as in step 73. If L>4, at least four parameters are correctable, or at least three parameters can be monitored, or a group with at least two satellites can be isolated, as in step 75, and the system proceeds to step 77.

In step 77, the system checks whether L≧5. If L is not ≧5, L=4 and four parameters are correctable, or three parameters can be monitored, or two parameters can be isolated, as in step 79. If L≧5, at least five parameters are correctable, or at least four parameters can be monitored, or a group with at least three satellites can be isolated, as in step 81. The system need not inquire further here, because monitoring four parameters is sufficient.

Figure 4:
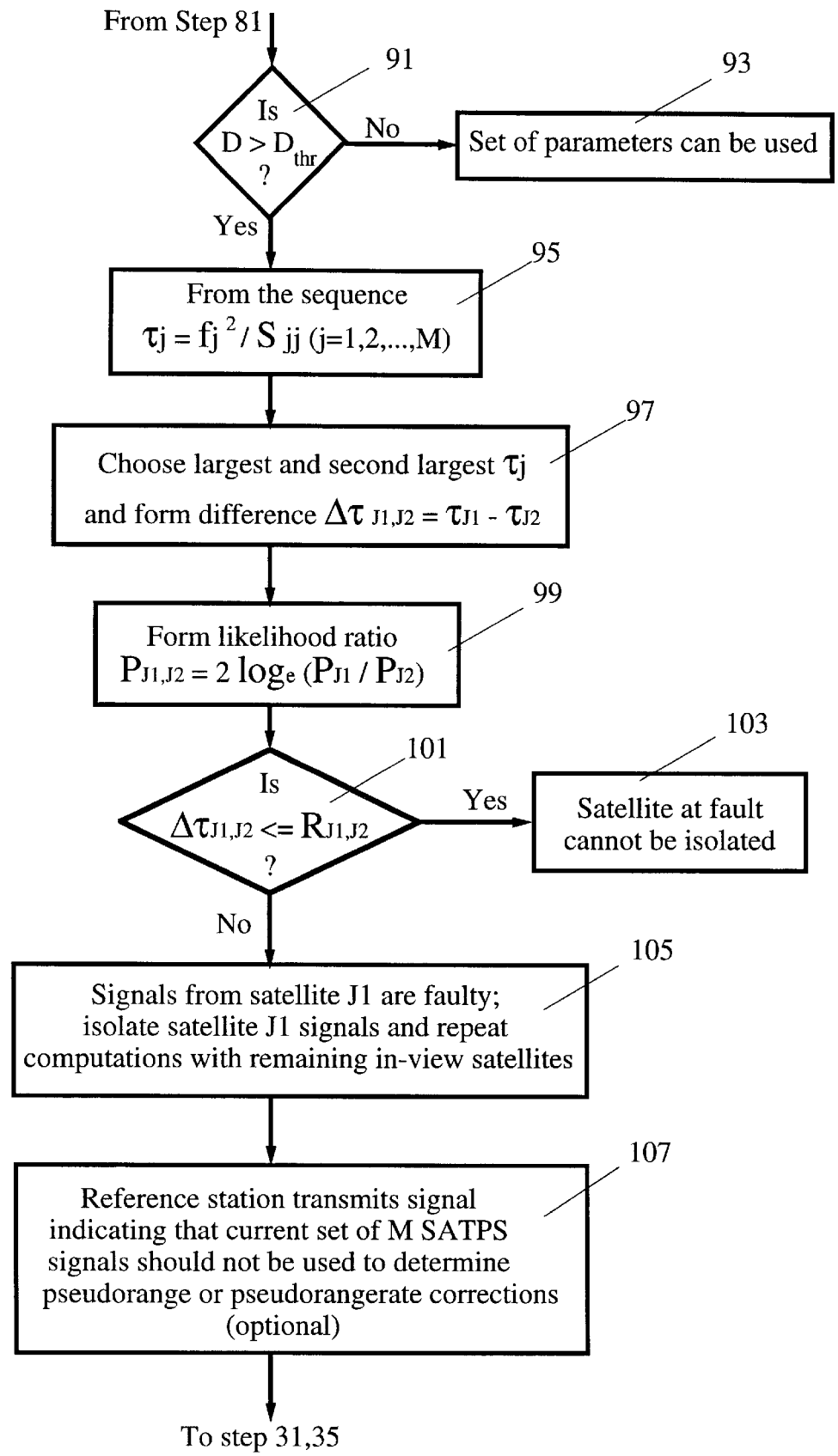

If at least one parameter can be isolated, as in steps 73, 75, 79 and/or 81, the system may use the fault vector isolation analysis set forth in connection with Eqs. (22), (23) and (24) to attempt to determine if a particular satellite is at fault, as illustrated in the diagram in FIG. 4. In step 91, the system first inquires if $D > D_{thr}$? If $D \leq D_{thr}$, the set of location parameters or velocity parameters can be used for correction and/or monitoring, as in step 93. If $D > D_{thr}$, the sequence of values $\tau_j = f_j^2/S_{jj}$ is formed, in step 95, and the largest and second largest values, $\tau_{J1}$ and $\tau_{J2}$, respectively, are identified, in step 97. In steps 99 and 101, the likelihood ratio $R_{J1,J2} = 2 \log_e(p_{J1}/P_{J2})$ is computed and compared with $\Delta\tau_{J1,J2} = \tau_{J1} - \tau_{J2}$. $-\tau_{J2}$. If $\Delta\tau_{J1,J2} \leq R_{J1,J2}$, as in step 103, the satellite(s) at fault cannot be isolated. If $\Delta\tau_{J1,J2} > R_{J1,J2}$, as in step 105, the signals from satellite j=J1 are faulty and should be isolated. In step 107 (optional), the DSATPS reference station transmits the PRC(t;i;j) and PRRC(t;i;j) corrections for that reference station-satellite combination but also transmits an error flag indicating that the accuracy of SATPS signals received from this satellite is unacceptable for use by a mobile station. The foregoing computations are repeated after removing the effects of SATPS signals received from satellite number J1.

In the foregoing discussion, it is assumed that the SIM station is stationary so that the location coordinates are fixed and known and the velocity coordinates are zero for that station. A mobile SATPS station that is near, but spaced apart from, the reference station (referred to for convenience as a "remote station" or REM station), can be substituted for the SIM station, and K (=4, preferably) location or velocity parameters can be corrected, if the number M of in-view SATPS satellites with acceptable SATPS signals satisfies the constraint M≧K. If M≧K+1 (or M≧K+2), K location or velocity coordinates can be monitored (or M-K-1 can be isolated). This allows use of a mobile SATPS station, whose location and/or velocity parameters are merely estimated initially, as a SIM, and does not require surveying, construction and operation of a separate, stationary SIM station.

In a conceptually simpler approach, the location coordinates $x(t;i)_{SIM}$, $y(t;i)_{SIM}$, $z(t;i)_{SIM}$ and the velocity coordinates $v(t;i)x_{SIM}$, $v(t;i)_{y,SIM}$, 30 $v(t;i)_{z,SIM}$ of the SIM station are computed from the SATPS signals received from the satellites. Location difference values and velocity difference values $$\Delta x(t;i)_{SIM} = x(t;i)_{SIM} - x(i)_{SIM,known}, \quad (30)$$

$$\Delta y(t;i)_{SIM} = y(t;i)_{SIM} - y)i)_{SIM,known}, \quad (31)$$

$$\Delta z(t;i)_{SIM} = z(t;i)_{SIM} - z(i)_{SIM,known}, \quad (32)$$

$$\Delta v(t;i)_{x,SIM} = v(t;i)_{x,SIM} - v(i)_{x,SIM,known}, \quad (33)$$

$$\Delta v(t;i)_{y,SIM} = v(t;i)_{y,SIM} - v(i)_{y,SIM,known}, \quad (34)$$

$$\Delta v(t;i)_{z,SIM} = v(t;i)_{z,SIM} - v(i)_{z,SIM,known}, \quad (35)$$

are then formed, where the location coordinates $x(i)_{SIM,known}$, $y(i)_{SIM,known}$, $Z(i)_{SIM,known}$ and the velocity coordinates $v(i)_{x,SIM,known}$, $v(i)_{y,SIM,known}$, $V(i)_{z,SIM,known}$ are the known location coordinates and velocity coordinates of the SIM station. The magnitudes of the six difference values in Eqs. (30)–(35) are then compared with respective selected threshold values $\Delta x(i)_{thr}$, $\Delta y(i)_{thr}$, $\Delta z(i)_{thr}$, $\Delta v(i)_{x,thr}$, $\Delta v(i)_{y,thr}$, and $\Delta v(i)_{z,thr}$, to determine whether the set of pseudorange and/or pseudorange rate signals received by the SIM station from the M SATPS satellites are of acceptable accuracy for use in correcting the location coordinates and/or the velocity coordinates of a nearby mobile SATPS station. If the conditions $$|\Delta x(t;i)_{SIM}| \leq \Delta x(i)_{thr}, \quad (36)$$

$$|\Delta y(t;i)_{SIM}| \leq \Delta y(i)_{thr}, \quad (37)$$

$$|\Delta z(t;i)_{SIM}| \leq \Delta z(i)_{thr}, \quad (38)$$

$$|\Delta v(t;i)_{x,SIM}| \leq \Delta v(i)_{x,thr}, \quad (39)$$

$$|\Delta v(t;i)_{y,SIM}| \leq \Delta v(i)_{y,thr}, \quad (40)$$

$$|\Delta v(t;i)_{z,SIM}| \leq \Delta v(i)_{z,thr}, \quad (41)$$

are all satisfied, the set of M pseudorange and/or pseudorange rate measurements can be used to correct K of the location coordinates and/or velocity coordinates of a nearby mobile station, provided that M≧K. If at least one of the Eqs. (36)–(41) is not satisfied, the set of M pseudorange and/or pseudorange rate measurements cannot be used to correct K of the location coordinates and/or velocity coordinates of a nearby mobile station. Preferably, the location difference thresholds $\Delta x(i)_{thr}$, etc. are chosen in the approximate range 10–30 meters and the velocity difference thresholds $\Delta v(i)_{x,thr}$, etc. are chosen in the range 0.5–1.6 meters/sec.

Alternatively, the three location differences, and also the three velocity differences, for the SIM station (i) may be combined in 2-D or 3-D Euclidean differences and compared with selected location difference thresholds $\Delta d_{thr}$ and velocity difference thresholds $\Delta v_{thr}$ in the forms $$[(\Delta x(t;i)_{SIM})^2+(\Delta y(t;i)_{SIM})^2]^{1/2} \leq \Delta d_{2,thr}, \quad (42)$$

$$[(\Delta v(t;i)_{x,SIM})^2+(\Delta v(t;i)_{y,SIM})^2]^{1/2} \leq \Delta v_{2,thr}, \quad (43)$$

$$[(\Delta x(t;i)_{SIM})^2+(\Delta y(t;i)_{SIM})^2+(\Delta z(t;i)_{SIM})^2]^{1/2} \leq \Delta d_{3,thr}, \quad (44)$$

$$[(\Delta v(t;i)_{x,SIM})^2+(\Delta v(it;i)_{y,SIM})^2+(\Delta v(t;i)_{z,SIM})^2]^{1/2} \leq v_{3,thr}. \quad (45)$$

In a similar manner, if all the Eqs. (36)–(41), or Eqs. (42)–(43), or Eqs (44)–(45) are satisfied and if $M \geq 1$, the set of M pseudorange and/or pseudorange rate measurements can be used to correct the clock bias and frequency offset parameters of a nearby mobile station. If at least one of the Eqs. (36)–(41), or Eqs. (42)–(45), is not satisfied, clock bias and frequency offset parameters for a mobile station cannot be corrected using pseudorange and pseudorange rate measurements from the set of M SATPS satellites.

A Satellite Positioning System (SATPS) is a system of satellite signal transmitters, with receivers located on the Earth's surface or adjacent to the Earth surface, that transmits information from which an observer's present location and/or the time of observation can be determined. Two operational systems, each of which qualifies as an SATPS, are the Global Positioning System and the Global Orbiting Navigation Satellite System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular.

The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz.

The Li signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals Li and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 September 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=0, 1, 2,..., 23) is the channel or satellite number. These frequencies lie in two bands at 1.597–1.617 GHz (LI) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Logsdon, op. cit., pp. 17–90, incorporated by reference herein.

We claim:

1. A method of determining the integrity of differential Satellite Positioning System (DSATPS) signals developed at a Satellite Positioning System (SATPS) reference station and used for correcting a set of K velocity fix coordinates ($1 \leq K \leq 4$) of a mobile SATPS station, the method comprising the steps of:

receiving SATPS signals at an SATPS reference station (RS), numbered i and having a known location, and at an SATPS signal integrity monitoring station (SIM), numbered i and having a known location, from M satellites ($M \geq K$);

determining pseudorange rate correction values for the RS station and for the SIM station for SATPS signals received from at least one common satellite (number j);

forming a magnitude of a difference between the pseudorange rate correction values for the RS station and for the SIM station for substantially the same observation time for the at least one common satellite; and when the magnitude of the difference is greater than a selected threshold rate, transmitting a signal indicating that SATPS signals received from the at least one common satellite cannot be used to correct K velocity fix coordinates for a mobile SATPS station using DSATPS signals received from the RS station.

2. The method of claim 1, further comprising the step of:

when said magnitude of said difference is not greater than said selected threshold rate, transmitting a signal indicating that SATPS signals received from said at least one common satellite can be used to correct K velocity fix coordinates for a mobile SATPS station using DSATPS signals received from said RS station.

3. The method of claim 1, further comprising the steps of:

measuring a carrier phase value, designated $\Phi(t;i;j)$, from an SATPS signal received at said RS station number i at time t from said at least one common satellite, for at least one RS station; and determining said pseudorange rate values, PRR(t;i;j), for at least one of said RS station and said SIM station by the relations $$PRR(t;i;j) = [\Phi(t;i;j) - \Phi(t-\Delta t;i;j)]/\Delta t,$$

where $\Delta t$ is a selected nonzero time increment.

4. The method of claim 1, further comprising the step of determining said pseudorange rate values, PRR(t;i;j), for said RS station number i and said at least one common satellite by the steps of:

measuring a carrier phase value, designated $\Phi(D(t;i;j)$, for an SATPS signal received at said RS station number i at time t from said at least one common satellite, for at least one RS station;

approximating a variable y(t) representing the carrier phase value $\Phi(t;i;j)$ in a time interval $t_{n-1} \leq t \leq t_{n+1}$ as a polynomial of degree at most two, $$y(t) = y_n + a_n(t-t_n) + b_n(t-t_n)^2,$$

using known values of the variable y(t) at three selected times $t=t_{n-1}$, $t=t_n$ and $t=t_{n+1}$, with $t_{n-1} \leq t_n \leq t_{n+1}$; and determining said pseudorange rate value, designated PRR$(t;i;j)_{RS}$, determined for said reference station i at the time $t=t_n$ and said at least one common satellite by the relation $$PRR(t_n;i;j)_{RS} = y(t_n) = a_n = \{(t_n-t_{n-1})^2[y(t_{n+1})-y(t_n)] + (t_{n+1}-t_n)^2[y(t_{n-1}) - y(t_n)]\}/(t_{n+1}-t_n)(t_{n+1}-t_{n-1})(t_{n+1}-t_{n-1}).$$

5. A method of determining the integrity of differential Satellite Positioning System (DSATPS) signals developed at a Satellite Positioning System (SATPS) reference station and used for correcting a set of K location fix coordinates ($1 \leq K \leq 4$) of a mobile SATPS station, the method comprising the steps of:

receiving SATPS signals at an SATPS reference station (RS), numbered i and having a known location, and at an SATPS signal integrity monitoring station (SIM), numbered i and having a known location, from M selected SATPS satellites ($M \geq K$);

determining pseudorange correction values for the RS station and for the SIM station for SATPS signals received from at least one common SATPS satellite;

forming a magnitude of a difference between the pseudorange correction values for the RS station and for the SIM station for substantially the same observation time for the at least one common satellite; and when the magnitude of the difference is greater than a selected threshold value, transmitting a signal indicating that SATPS signals received from the at least one common satellite cannot be used to correct K location fix coordinates for a mobile SATPS station using DSATPS signals received from the RS station.

6. The method of claim 5, further comprising the step of:
when said magnitude of said difference is not greater than said selected threshold rate, transmitting a signal indicating that SATPS signals received from said at least one common satellite can be used to correct K location fix coordinates for a mobile SATPS station using DSATPS signals received from said RS station.

7. A method of determining the integrity of differential Satellite Positioning System (DSATPS) signals developed at a Satellite Positioning System (SATPS) reference station and used for monitoring a set of K velocity fix coordinates ($1 \leq K \leq 4$) of a mobile SATPS station, the method comprising the steps of:
receiving SATPS signals at an SATPS reference station (RS), numbered i and having a known location, and at an SATPS signal integrity monitoring station (SIM), numbered i and having a known location, from M selected SATPS satellites ($M \geq K+1$);
determining pseudorange rate correction values for the RS station and for the SIM station for SATPS signals received from at least one common SATPS satellite (number j);
forming a magnitude of a difference between the pseudorange rate correction values for the RS station and for the SIM station for substantially the same observation time for the at least one common satellite and
when the magnitude of the difference is greater than a selected threshold rate, transmitting a signal indicating that SATPS signals received from the at least one common satellite cannot be used to monitor K velocity fix coordinates for a mobile SATPS station using DSATPS signals received from the RS station number i.

8. The method of claim 7, further comprising the step of:
when said magnitude of said difference is not greater than said selected threshold rate, transmitting a signal indicating that SATPS signals received from said at least one common satellite can be used to monitor K velocity fix coordinates for a mobile SATPS station using DSATPS signals received from said RS station.

9. The method of claim 7, further comprising the steps of:
measuring a carrier phase value, designated $\Phi(t;i;j)$, from an SATPS signal received at said RS station number i at time t from said at least one common satellite, for at least one RS station; and
determining said pseudorange rate values, PRR(t;i;j), for at least one of said RS station and said SIM station by the relations $$PRR(t;i;j) = [\Phi(t;i;j) - \Phi(t-\Delta t;i;j)]/\Delta t,$$

where $\Delta t$ is a selected nonzero time increment.

10. The method of claim 7, further comprising the step of determining said pseudorange rate values, PRR(t;i;j), for said RS station number i and said at least one common satellite by the steps of:
measuring a carrier phase value, designated $\Phi(t;i;j)$, for an SATPS signal received at said RS station number i at time t from said at least one common satellite, for at least one RS station;
approximating a variable y(t) representing the carrier phase value $\Phi(t;i;j)$ in a time interval $t_{n-1} \leq t \leq t_{n+1}$ as a polynomial of degree at most two, $$y(t) = y_n + a_n(t-t_n) + b_n(t-t_n)^2,$$

using known values of the variable y(t) at three selected times $t=t_{n-1}$, $t=t_n$ and $t=t_{n+1}$, with $t_{n-1} \leq t_n \leq t_{n+1}$; and
determining said pseudorange rate value, designated PRR $(t;i;j)_{RS}$, determined for said reference station i at the time $t=t_n$ and said at least one common satellite by the relation $$PRR(t_n;i;j)_{RS} = y'(t_n) = a_n = \{(t_n-t_{n-1})^2[y(t_{n+1})-y(t_n)] + (t_{n+1}-t_n)^2[y(t_{n-1})-y(t_n)]\}/(t_{n+1}-t_n)(t_{n+1}-t_{n-1})(t_{n+1}-t_{n-1}).$$

11. A method of determining the integrity of differential Satellite Positioning System (DSATPS) signals developed at a Satellite Positioning System (SATPS) reference station and used for monitoring a set of K location fix coordinates ($1 \leq K \leq 4$) of a mobile SATPS station, the method comprising the steps of:
receiving SATPS signals at an SATPS reference station (RS), numbered i and having a known location, and at an SATPS signal integrity monitoring station (SIM), numbered i and having a known location, from M selected SATPS satellites ($M \geq K+1$);
determining pseudorange correction values for the RS station and for the SIM station for SATPS signals received from at least one common satellite;
forming a magnitude of a difference between the pseudorange correction values for the RS station and for the SIM station for substantially the same observation time for the at least one common satellite; and
when the magnitude of the difference is greater than a selected threshold value, transmitting a signal indicating that SATPS signals received from the at least one common satellite cannot be used to monitor K location fix coordinates for a mobile SATPS station using DSATPS signals received from the RS station number i.

12. The method of claim 11, further comprising the step of:
when said magnitude of said difference is not greater than said selected threshold value, transmitting a signal indicating that SATPS signals received from said at least one common satellite can be used to monitor K location fix coordinates for a mobile SATPS station using DSATPS signals received from said RS station.

13. A method of determining the integrity of differential Satellite Positioning System (DSATPS) signals developed at a Satellite Positioning System (SATPS) reference station and used for correcting the frequency offset for a mobile SATPS station, the method comprising the steps of:
receiving SATPS signals at an SATPS reference station (RS), numbered i and having a known location, and at an SATPS signal integrity monitoring station (SIM), numbered i and having a known location, from M selected SATPS satellites ($M \geq 1$);
determining pseudorange rate correction values for the RS station and for the SIM station for SATPS signals received from at least one common satellite (number j);
forming a magnitude of a difference between the pseudorange rate correction values for the RS station and for the SIM station for substantially the same observation time for the at least one common satellite; and
when the magnitude of the difference is greater than a selected threshold rate, transmitting a signal indicating that SATPS signals received from the at least one common satellite cannot be used for correcting the frequency offset of a mobile SATPS station using DSATPS signals received from the RS station number i.

14. The method of claim 13, further comprising the step of:

when said magnitude of said difference is not greater than said selected threshold rate, transmitting a signal indicating that SATPS signals received from said at least one common satellite can be used for correcting the frequency offset of a mobile SATPS station using DSATPS signals received from said RS station.

15. The method of claim 13, further comprising the steps of:

measuring a carrier phase value, designated $\Phi(t;i;j)$, from an SATPS signal received at said RS station number i at time t from said at least one common satellite, for at least one RS station; and determining said pseudorange rate values, $PRR(t;i;j)$, for at least one of said RS station and said SIM station by the relations $$PRR(t;i;j) = [\Phi(t;i;j) - \Phi(t - \Delta t;i;j)]/\Delta t,$$

where $\Delta t$ is a selected nonzero time increment.

16. The method of claim 13, further comprising the step of determining said pseudorange rate values, $PRR(t;i;j)$, for said RS station number i and said at least one common satellite by the steps of:

measuring a carrier phase value, designated $\Phi(t;i;j)$, for an SATPS signal received at said RS station number i at time t from said at least one common satellite, for at least one RS station;

approximating a variable $y(t)$ representing the carrier phase value $\Phi(t;i;j)$ in a time interval $t_{n-1} \leq t \leq t_{n+1}$ as a polynomial of degree at most two, $$y(t) = y_n + a_n(t - t_n) + b_n(t - t_n)^2,$$

using known values of the variable $y(t)$ at three selected times $t = t_{n-1}$, $t = t_n$ and $t = t_{n+1}$, with $t_{n-1} \leq t_{n+1}$; and determining said pseudorange rate value, designated $PRR(t;i;j)_{RS}$, determined for said reference station i at the time $t = t_n$ and at least one common satellite by the relation $$PRR(t_n;i;j)_{RS} = y'(t_n) = a_n = \{(t_n - t_{n-1})^2[y(t_{n+1}) - y(t_n)] + (t_{n+1} - t_n)^2[y(t_{n-1}) - y(t_n)]\}/(t_{n+1} - t_n)(t_{n+1} - t_{n-1})(t_{n+1} - t_{n-1}).$$

17. A method of determining the integrity of differential Satellite Positioning System (DSATPS) signals developed at a Satellite Positioning System (SATPS) reference station and used for correcting the clock bias for a mobile SATPS station, the method comprising the steps of:

receiving SATPS signals at an SATPS reference station (RS), numbered i and having a known location, and at an SATPS signal integrity monitoring station (SIM), numbered i and having a known location, from M selected SATPS satellites ($M \geq 1$);

determining pseudorange correction values for the RS station and for the SIM station for SATPS signals received from at least one common satellite;

forming a magnitude of a difference between the pseudorange correction values for the RS station and for the SIM station for substantially the same observation time for the at least one common satellite; and when the magnitude of the difference is greater than a selected threshold value, transmitting a signal indicating that SATPS signals received from the at least one common satellite cannot be used for correcting a clock bias of a mobile SATPS station using DSATPS signals received from the RS station number i.

18. The method of claim 17, further comprising the step of:

when said magnitude of said difference is not greater than said selected threshold value, transmitting a signal indicating that SATPS signals received from said at least one common satellite can be used for correcting a clock bias of a mobile SATPS station using DSATPS signals received from said RS station.

19. A method of determining the integrity of differential Satellite Positioning System (DSATPS) signals developed at a Satellite Positioning System (SATPS) reference station and used for monitoring the frequency offset for a mobile SATPS station, the method comprising the steps of:

receiving SATPS signals at an SATPS reference station (RS), numbered i and having a known location, and at an SATPS signal integrity monitoring station (SIM), numbered i and having a known location, from M selected SATPS satellites ($M \geq 2$);

determining pseudorange rate correction values for the RS station and for the SIM station for SATPS signals received from at least one common satellite (number j);

forming a magnitude of a difference between the pseudorange rate correction values for the RS station and for the SIM station for substantially the same observation time for the at least one common satellite; and when the magnitude of the difference is greater than a selected threshold rate, transmitting a signal indicating that SATPS signals received from the at least one common satellite cannot be used for monitoring the frequency offset of a mobile SATPS station using DSATPS signals received from the RS station number i.

20. The method of claim 19, further comprising the step of:

when said magnitude of said difference is not greater than said selected threshold rate, transmitting a signal indicating that SATPS signals received from said at least one common satellite can be used for monitoring the frequency offset of a mobile SATPS station using DSATPS signals received from said RS station.

21. The method of claim 19, further comprising the steps of:

measuring a carrier phase value, designated $\Phi(t;i;j)$, from an SATPS signal received at said RS station number i at time t from said at least one common satellite, for at least one RS station; and determining said pseudorange rate values, $PRR(t;i;j)$, for at least one of said RS station and said SIM station by the relations $$PRR(t;i;j) = [\Phi(t;i;j) - \Phi(t - \Delta t;i;j)]/\Delta t$$

where $\Delta t$ is a selected nonzero time increment.

22. The method of claim 19, further comprising the step of determining said pseudorange rate values, $PRR(t;i;j)$, for said RS station number i and said at least one common satellite by the steps of:

measuring a carrier phase value, designated $\Phi(t;i;j)$, for an SATPS signal received at said RS station number i at time t from said at least one common satellite, for at least one RS station;

approximating a variable y(t) representing the carrier phase value $\Phi(t;i;j)$ in a time interval $t_{n-1} \leq t \leq t_{n+1}$ as a polynomial of degree at most two, $$y(t)=y_n+a_n(t-t_n)+b_n(t-t_n)^2,$$

using known values of the variable y(t) at three selected times $t=t_{n-1}$, $t=t_n$ and $t=t_{n+1}$, with $t_{n-1} \leq t_n \leq t_{n+1}$; and determining said pseudorange rate value, designated PRR $(t;i;j)_{RS}$, determined for said reference station i at the time $t=t_n$ and said at least one common satellite by the relation $$PRR(t_n;i;j)_{RS}=y(t_n)=a_n=\{(t_n-t_{n-1})^2[y(t_{n+1})-y(t_n)]+(t_{n+1}-t_n)^2[y(t_{n-1})-y(t_n)]\}/(t_{n+1}-t_n)(t_{n+1}-t_{n-1})(t_{n+1}-t_{n-1}).$$

23. A method of determining the integrity of differential Satellite Positioning System (DSATPS) signals developed at a Satellite Positioning System (SATPS) reference station and used for monitoring the clock bias for a mobile SATPS station, the method comprising the steps of:

receiving SATPS signals at an SATPS reference station (RS), numbered i and having a known location, and at an SATPS signal integrity monitoring station (SIM), numbered i and having a known location, from M selected SATPS satellites ($M \geq 2$);

determining pseudorange correction values for the RS station and for the SIM station for SATPS signals received from at least one common satellite;

forming a magnitude of a difference between the pseudorange correction values for the RS station and for the SIM station for substantially the same observation time for the at least one common satellite; and when the magnitude of the difference is greater than a selected threshold value, transmitting a signal indicating that SATPS signals received from the at least one common satellite cannot be used for monitoring a clock bias of a mobile SATPS station using DSATPS signals received from the RS station number i.

24. The method of claim 23, further comprising the step of:

when said magnitude of said difference is not greater than said selected threshold value, transmitting a signal indicating that SATPS signals received from said at least one common satellite can be used for monitoring a clock bias of a mobile SATPS station using DSATPS signals received from said RS station.

25. A method of determining the integrity of differential Satellite Positioning System (DSATPS) signals developed at a Satellite Positioning System (SATPS) reference station and used for correcting at least one of a set of K velocity coordinates ($1 \leq K \leq 3$) of a mobile SATPS station, the method comprising the steps of:

receiving SATPS signals at an SATPS reference station (RS), numbered i and having a known location, and at an SATPS signal integrity monitoring station (SIM), numbered i and having a known location and known velocity coordinates, from M selected SATPS satellites ($M \geq K$);

determining velocity coordinates for the SIM station for SATPS signals received from the satellites;

forming a magnitude of at least one velocity difference between each known velocity coordinate and the corresponding determined velocity coordinate for the SIM station for substantially the same observation time for at least one common satellite; and when the magnitude of the at least one velocity difference is greater than a selected threshold velocity difference, transmitting a signal indicating that SATPS signals received from the M satellites cannot be used to correct K velocity coordinates for a mobile SATPS station using DSATPS signals received from the RS station number i.

26. The method of claim 25, further comprising the step of:

when the magnitude of each said velocity difference is no greater than said selected threshold velocity difference, transmitting a signal indicating that SATPS signals received from the M satellites can be used to correct K velocity coordinates for a mobile SATPS station using DSATPS signals received from the RS station number i.

27. A method of determining the integrity of differential Satellite Positioning System (DSATPS) signals developed at a Satellite Positioning System (SATPS) reference station and used for correcting at least one of a set of K location coordinates ($1 \leq K \leq 3$) of a mobile SATPS station, the method comprising the steps of:

receiving SATPS signals at an SATPS reference station (RS), numbered i and having a known location, and at an SATPS signal integrity monitoring station (SIM), numbered i and having known location coordinates, from M selected SATPS satellites ($M \geq K$);

determining location coordinates for the SIM station for SATPS signals received from the satellites;

forming a magnitude of at least one location difference between each known location coordinate and the corresponding determined location coordinate for the SIM station for substantially the same observation time for at least one common satellite; and when the magnitude of the at least one location difference is greater than a selected threshold velocity difference, transmitting a signal indicating that SATPS signals received from the M satellites cannot be used to correct K location coordinates for a mobile SATPS station using DSATPS signals received from the RS station number i.

28. The method of claim 27, further comprising the step of:

when the magnitude of each said location difference is no greater than said selected threshold location difference, transmitting a signal indicating that SATPS signals received from the M satellites can be used to correct K location coordinates for a mobile SATPS station using DSATPS signals received from the RS station number i.

29. A method of determining the integrity of differential Satellite Positioning System (DSATPS) signals developed at a Satellite Positioning System (SATPS) reference station and used for correcting the frequency offset for a mobile SATPS station, the method comprising the steps of:

receiving SATPS signals at an SATPS reference station (RS), numbered i and having a known location, and at an SATPS signal integrity monitoring station (SIM), numbered i and having a known location and known velocity coordinates, from M SATPS satellites ($M \geq 1$);

determining velocity coordinates for the SIM station for SATPS signals received from the satellites;

forming a magnitude of at least one velocity difference between each known velocity coordinate and the corresponding determined velocity coordinate for the SIM station for substantially the same observation time for at least one common satellite; and when the magnitude of the at least one velocity difference is greater than a selected threshold velocity difference, transmitting a signal indicating that SATPS signals received from the M satellites cannot be used to correct frequency offset for a mobile SATPS station using DSATPS signals received from the RS station number i.

30. The method of claim 29, further comprising the step of:

when the magnitude of each said velocity difference is no greater than said selected threshold velocity difference, transmitting a signal indicating that SATPS signals received from the M satellites can be used to correct frequency offset for a mobile SATPS station using DSATPS signals received from the RS station number i.

31. A method of determining the integrity of differential Satellite Positioning System (DSATPS) signals developed at a Satellite Positioning System (SATPS) reference station and used for correcting the clock bias for a mobile SATPS station, the method comprising the steps of:

receiving SATPS signals at an SATPS reference station (RS), numbered i and having a known location, and at an SATPS signal integrity monitoring station (SIM), numbered i and having known location coordinates, from M selected SATPS satellites (M≧1);

determining location coordinates for the SIM station for SATPS signals received from the M satellites;

forming at least one magnitude of a location difference between each known location coordinate and the corresponding determined location coordinate for the SIM station for substantially the same observation time for at least one common satellite; and when the magnitude of the at least one location difference is greater than a selected threshold velocity difference, transmitting a signal indicating that SATPS signals received from the M satellites cannot be used to clock bias for a mobile SATPS station using DSATPS signals received from the RS station number i.

32. The method of claim 31, further comprising the step of:

when the magnitude of each said location difference is no greater than said selected threshold location difference, transmitting a signal indicating that SATPS signals received from the M satellites can be used to correct clock bias for a mobile SATPS station using DSATPS signals received from the RS station number i.

33. A method of determining the integrity of differential Satellite Positioning System (DSATPS) signals developed at a Satellite Positioning System (SATPS) reference station and used for correcting at least one of a set of K velocity coordinates (1≦K≦3) of a mobile SATPS station, the method comprising the steps of:

receiving SATPS signals at an SATPS reference station (RS), numbered i and having a known location, and at an SATPS signal integrity monitoring station (SIM), numbered i and having a known location and known velocity coordinates, from M selected SATPS satellites (M≧K);

determining velocity coordinates for the SIM station for SATPS signals received from the satellites;

forming a velocity difference between each known velocity coordinate and the corresponding determined velocity coordinate for the SIM station for substantially the same observation time for the M satellites; and when a sum of squares of the velocity differences is greater than a selected threshold velocity difference squared, transmitting a signal indicating that SATPS signals received from the M satellites cannot be used to correct K velocity fix coordinates for a mobile SATPS station using DSATPS signals received from the RS station number i.

34. The method of claim 33, further comprising the step of:

when a sum of squares of the velocity differences is no greater than said selected threshold velocity difference squared, transmitting a signal indicating that SATPS signals received from the M satellites can be used to correct K velocity fix coordinates for a mobile SATPS station using DSATPS signals received from the RS station number i.

35. A method of determining the integrity of differential Satellite Positioning System (DSATPS) signals developed at a Satellite Positioning System (SATPS) reference station and used for correcting at least one of a set of K location coordinates (1≦K≦3) of a mobile SATPS station, the method comprising the steps of:

receiving SATPS signals at an SATPS reference station (RS), numbered i and having a known location, and at an SATPS signal integrity monitoring station (SIM), numbered i and having known location coordinates, from M selected SATPS satellites (M≧K);

determining location coordinates for the SIM station for SATPS signals received from the satellites;

forming a location difference between each known location coordinate and the corresponding determined location coordinate for the SIM station for substantially the same observation time for the M satellites; and when a sum of squares of the location differences is greater than a selected threshold location difference squared, transmitting a signal indicating that SATPS signals received from the M satellites cannot be used to correct K location fix coordinates for a mobile SATPS station using DSATPS signals received from the RS station number i.

36. The method of claim 35, further comprising the step of:

when a sum of squares of the location differences is no greater than said selected threshold location difference squared, transmitting a signal indicating that SATPS signals received from the M satellites can be used to correct K location fix coordinates for a mobile SATPS station using DSATPS signals received from the RS station number i.

* * * * *